Aug. 5, 1924.
G. R. BIRRELL
1,504,085
POWER GENERATING ATTACHMENT FOR AIRPLANES
Filed Feb. 29, 1924   2 Sheets-Sheet 1
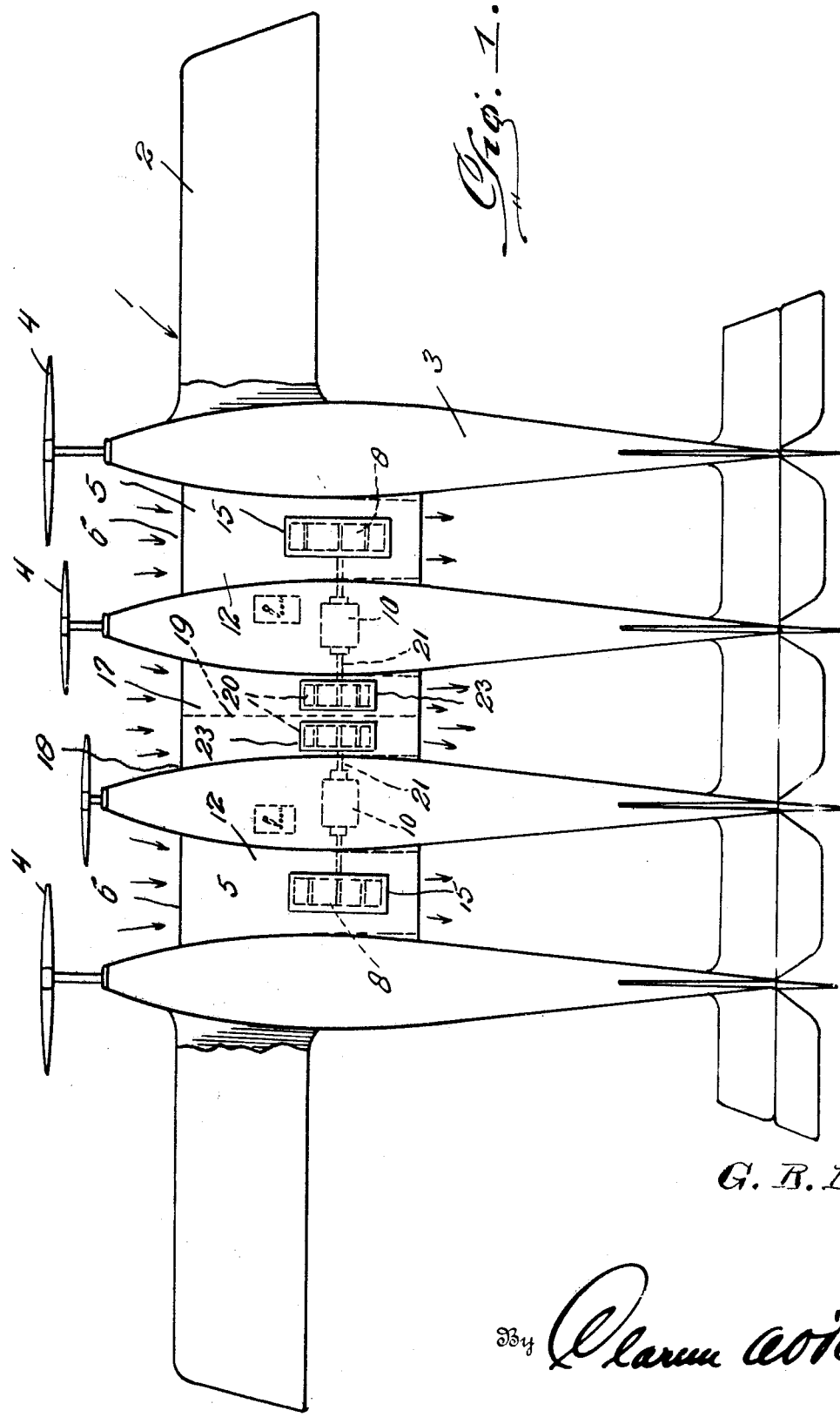
G. R. Birrell,
Inventor
By Clarence A. O'Brien
Attorney

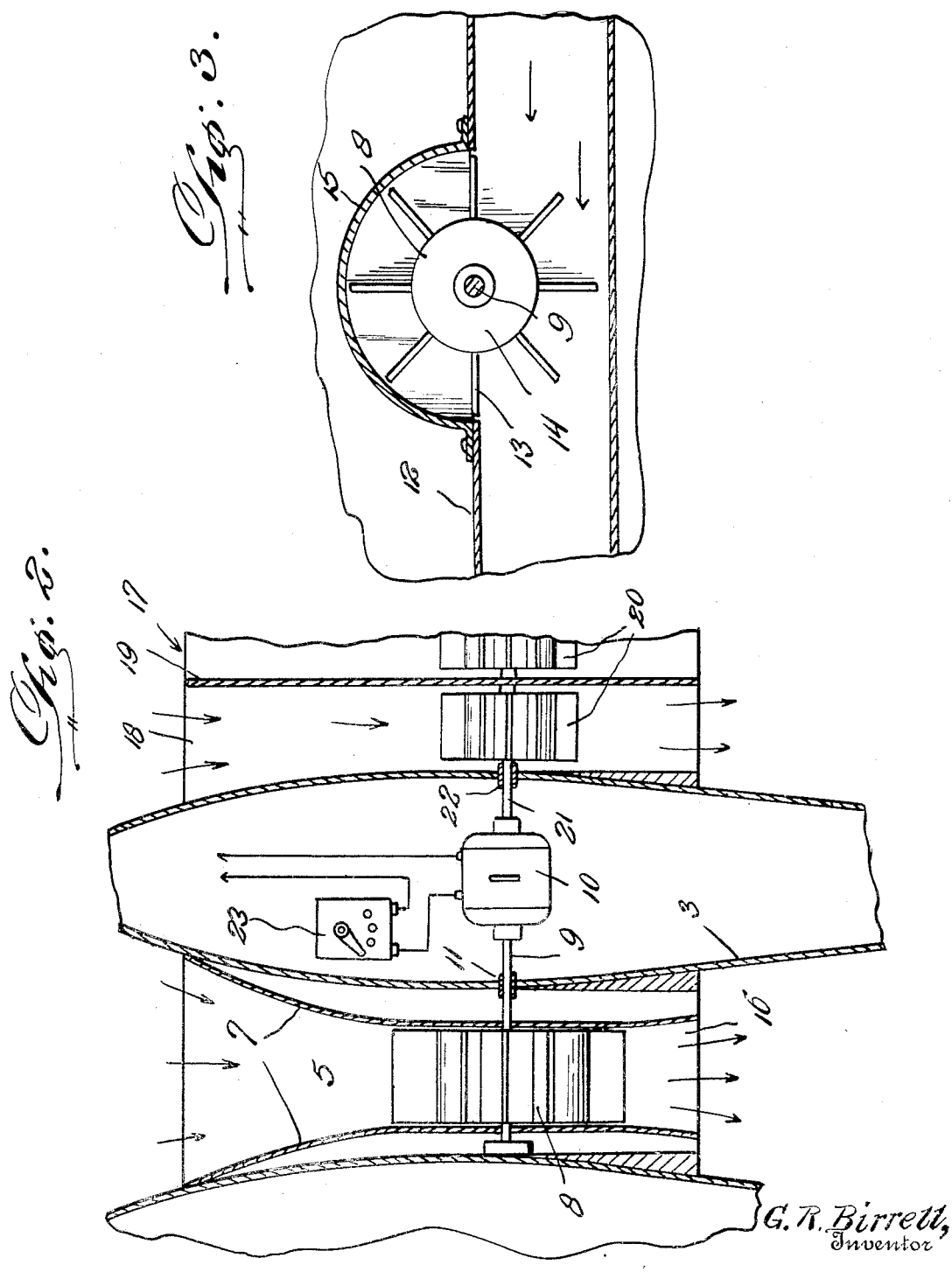

Patented Aug. 5, 1924.

1,504,085

UNITED STATES PATENT OFFICE.

GAVIN ROY BIRRELL, OF SALT LAKE CITY, UTAH.

POWER-GENERATING ATTACHMENT FOR AIRPLANES.

Application filed February 29, 1924. Serial No. 695,956.

*To all whom it may concern:*

Be it known that I, GAVIN ROY BIRRELL, a citizen of the United States, residing at Salt Lake City, in the county of Salt Lake and State of Utah, have invented certain new and useful Improvements in Power-Generating Attachments for Airplanes, of which the following is a specification.

This invention relates to improvements in power generating attachments for airplanes.

An object of the invention is to provide an airplane having a plurality of spaced bodies for carrying the operating mechanism for the planes wherein a plurality of air conducting members are mounted between the bodies for conducting and centralizing air entering the enlarged end portion thereof against a suitable rotatable member for operating an electric generator for generating power to be used for any desired purposes in the plane.

Another object of the invention resides in providing air conducting members between the outer body for intensifying the force thereof by a reduction in suction of the members and directing said air against the rotatable elements carried by the shaft members mounted in the members for operating generators in the central body, an air conducting member being provided between the central bodies having a central partition wall for dividing the air passing therethrough into a reduced space for concentrating the force thereof against a pair of rotatable members mounted on shaft extensions carried by the generator for cooperation with the first mentioned rotatable member to operate the generator for generating power adapted for use within the plane.

Other objects and features of the construction are more particularly described in the following description and claims directed to a preferred form of the invention, it being understood however, that variations may be made in the relation of the parts within the scope and spirit of the appended claims.

In the drawings, forming a part of this application;

Figure 1 is a plan view of a plane having a plurality of spaced body members, portions thereof being broken away to show the invention in its applied relation.

Figure 2 is a horizontal section through the bodies and the air conveying members showing the detailed constructions thereof.

Figure 3 is a vertical longitudinal section through one of the air conducting members showing the manner of mounting and housing the rotatable element therein.

A form of aeroplane is indicated generally at 1 having wings 2, and a plurality of bodies 3 arranged in spaced relation in the central portions of the wings and each provided with suitable propelling means indicated generally at 4 and operable from means carried within the body, a construction of these several parts being of any desirable form now known in the art.

In the space between the outer body members and the adjacent spaced bodies are mounted air conducting members 5 having substantially large forward ends 6 which taper in section to correspond with the contour of the adjacent sides of the bodies 3, the section thereof being reduced toward the rear end as may be clearly ascertained from an inspection of Figures 1 and 2. These members are mounted against the lower wing between the body and are provided with supplemental walls 7 tapering inwardly from the forward end 6 for reducing the cross sectional area of the air passage in the members for directing a concentrated force of air against the rotatable members 8 mounted on the generator shafts 9 extending from the generators 10. These generator shafts 9 extend through the sides of the body 3 and have bearings therein indicated at 11, said shafts lying in the horizontal plane of the top 12 of said air conducting members 5, so that the blades 13 extending from the hubs 14 of the rotatable members 8 are adapted to have the air passing through said air conducting members 5 directed against the blades at the lower half of the rotatable member, while the blades on the upper half of said member rotate in a dead air space formed by a semi-cylindrical housing 15 mounted on the top wall 12 of the air conducting members as clearly shown in Figure 3, the supplemental wall 7 diverging outwardly in the rear of the rotatable members 8 to permit a discharge of the air between the body members at the rear of the plane as indicated at 16. Between the central bodies 3, a special type of air conducting member is provided indicated at 17 having a flared and enlarged forward end 18 which tapers to correspond with the bodies 3 so that the cross sectional area of the air conducting member is smaller in the central and rear portions thereof than the forward end. A vertical partition wall 19 is provided in the central portion of this central air conducting member 17 for dividing the air received thereby to direct it against a pair of substantially smaller rotatable elements 20, which are rotatably mounted on shaft extensions 21 from the generators 10, the detailed construction of this element being the same as the rotatable elements 8 except that they are of reduced size to correspond with the section of the air conducting members 17, the shaft extensions 21 also having bearings in the air conducting member and the body as indicated at 22, the shaft extensions 21 extending into the air conducting members 17 in the plane of the top portion thereof, and cover members 23 carried by the top wall providing a dead air space for the upper half of the rotatable element 20 as above described for the rotatable elements 8. When the aeroplane is flying, it will thus be seen that the large and small rotatable elements 8 and 20 will operate through their respective shaft extensions to rotate the armature of the generators 10 and generate electric power for use in the plane in any desired purpose, which may be controlled by suitable rheostats 23 if desired.

From the above description, it will thus be seen that a simple and efficient attachment has been provided for operating electric generators in aeroplanes which may be readily attached between the bodies of said planes in the manner above described.

What is claimed is:

1. A power generating attachment for aeroplanes whereby the aeroplane comprises a plurality of spaced bodies including air conducting members mounted between the bodies, electric generators mounted in the bodies and having shaft extensions projecting and having bearing in said air conducting members, and rotatable elements mounted in said air conducting members adapted to be operated by the air passing therethrough, said air conducting members having means for concentrating the air received therein against the rotatable element for operating the same.

2. In an aeroplane attachment wherein the plane comprises a plurality of bodies arranged in spaced relation and having the supporting rings extending therefrom and carried thereby, said bodies also carrying the propelling means for the aeroplane comprising generators mounted in the body, air conducting bodies mounted between the outer bodies and the adjacent bodies having enlarged forward ends for receiving air throughout a substantially large cross sectional area, supplemental walls mounted in said air conducting members for reducing the cross sectional area of said member and intensifying the force of the air received therein, a central air conducting member mounted between the central bodies of the plane and having an enlarged forward end tapering rearwardly and inwardly for reducing the cross sectional area of the member, said central member having a central vertical partition wall therein, generators mounted in the central body having shaft extensions extending through said body and into the central air conducting member and the first mentioned air conducting members between the outer body, said shaft lying in the plane of the top portion of the air conducting members, rotatable elements mounted on said shaft having a plurality of blades extending into said air conducting member, semi-circular housings for the upper portions of said rotatable elements mounted on the top wall of said air conducting members for providing a dead air space for the upper portion of said elements whereby the air received in the enlarged open ends of said air conducting members will be forced through a contracted space formed by the reduction of the cross sectional area of the members and directed against the blades of said rotatable elements for rotating said elements and the shaft extensions, and for operating the generators to provide a source of electrical power in the aeroplane.

In testimony whereof I affix my signature.

GAVIN ROY BIRRELL.